(12) United States Patent
Elliott (10) Patent No.: US 7,633,972 B1
(45) Date of Patent: Dec. 15, 2009

(54) DYNAMIC PACKET CONCATENATION

(75) Inventor: Stephen Bennett Elliott, Allen, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 714 days.

(21) Appl. No.: 11/069,656

(22) Filed: Mar. 1, 2005

(51) Int. Cl.
*H04J 3/24* (2006.01)

(52) U.S. Cl. .................. 370/474; 370/465; 370/476

(58) Field of Classification Search ......... 370/470–472, 370/474, 476
See application file for complete search history.

(56) References Cited

U.S. PATENT DOCUMENTS

| | | | |
|---|---|---|---|
| 5,541,919 A * | 7/1996 | Yong et al. | 370/416 |
| 6,298,057 B1 * | 10/2001 | Guy et al. | 370/389 |
| 6,747,977 B1 * | 6/2004 | Smith et al. | 370/395.64 |
| 6,781,994 B1 * | 8/2004 | Nogami et al. | 370/395.1 |
| 7,298,745 B2 * | 11/2007 | Egevang | 370/394 |
| 2006/0039379 A1 * | 2/2006 | Abe et al. | 370/394 |

* cited by examiner

*Primary Examiner*—Phirin Sam
(74) *Attorney, Agent, or Firm*—Withrow & Terranova, P.L.L.C.

(57) ABSTRACT

In a multi-service communication environment, the present invention determines packet length criteria and provides the packet length criteria to access nodes for a network. The packet length criteria identify a packet length at which packets for delivery over the network are too long. Packets that are too long are disassembled and used to create shorter packets. The shorter packets and original packets that were not too long are then forwarded over the network. At the other end of the network, the original and shorter packets are received, wherein the shorter packets are used to recreate the original packets that were deemed too long for transmission by the packet length criteria. In addition to the packet length criteria, transmission priority criteria may be determined and used to prioritize the transmission of packets, including original packets or those packets that were shortened, for delivery over the network.

23 Claims, 4 Drawing Sheets

DYNAMIC PACKET CONCATENATION

FIELD OF THE INVENTION

The present invention relates to communications, and in particular to a technique for dynamically controlling packet length in a multi-service environment.

BACKGROUND OF THE INVENTION

Traditionally, dedicated access networks have been used to provide dedicated services. For example, cable networks would provide television services, telephone networks would provide telephone services, and data networks would provide data services. With the rapid acceptance and expansion of packet-based technologies, there is a movement toward providing disparate services over a common packet network.

While significant progress has been made to provide core networks capable of transporting packets for various services, access networks connecting to a subscriber's residence or place of business are still relatively separate. Although data services may be overlaid on telephony access networks, these access networks are not configured to support a wide range of simultaneous services such as telephony, video and multimedia. Further, there is little control over the various types of media provided via the data services.

As these media services mature, there will be a need to support voice, audio, video, and other real-time or streaming applications where timely delivery of packets is important over a common access network. Any access network providing a connection to the subscriber premises is likely to have limited bandwidth with respect to the number of services that are available and contending for that limited bandwidth. Given the movement to provide multiple services over a single access network and the different quality of service requirements associated with these services, there is a need for a technique to control the allocation of resources for individual services and assure that subscribers are provided with the resources to which they subscribe while not being allowed access to resources to which they are not entitled.

Service providers are also struggling to use the access networks efficiently by maximizing use of available network resources. Such efficiency is difficult when faced with allocating resources for different types of services, which often require different performance requirements. In particular, different types of services generally result in packets of significantly different lengths and having different transmission priority. As the finite capacity of the access network is approached, routing packets of different lengths with different transmission priorities becomes more difficult, if not impossible. For real-time traffic, such as voice or streaming audio and video sessions, concurrent processing of relatively long packets for a data session may significant impact the ability to timely deliver the real time traffic. For example, time-sensitive real time traffic packets may be delayed while transmitting an excessively long data packet, which is not time-sensitive. If all of the packets for the various sessions were of a relatively similar length, or at least were not excessive in length, resource allocation and prioritization could be better managed.

SUMMARY OF THE INVENTION

In a multi-service communication environment, the present invention determines packet length criteria, which is based on service information, network information, or a combination thereof, and provides the packet length criteria to access nodes for a network, such as an access network. The packet length criteria identify a packet length at which packets for delivery over the network are too long. For those packets that are too long, they are disassembled and used to create shorter packets. The shorter packets as well as the original packets that were not too long are then forwarded over the network. At the other end of the network, the original and shorter packets are received, wherein the shorter packets are used to recreate the original packets that were deemed too long for transmission by the packet length criteria. In addition to the packet length criteria, transmission priority criteria may be determined and used to prioritize the transmission of packets, including original packets or those packets that were shortened, for delivery over the network. These operations are provided in real time in a dynamic fashion.

The service information relates to the subscription parameters of a customer for one or more services that are provided over the network. The service information may relate to quality of service or quality of experience parameters, which may involve packet loss, latency, jitter, or bandwidth requirements. The network information relates to the capabilities of the network in light of the network's available resources and abilities. These resources and abilities may be determined based on the network's overall capabilities and the extent to which network resources are being used.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides dynamic packet concatenation in a multi-service communication environment to help maintain prescribed quality of service requirements and optimize the use of network capacity. In general, packets supporting multiple services, which may include different types of services, are transferred over a particular network. The length of the packets being transferred over the network is controlled based on service requirements and network capability. As traffic demand increases, the lengths of all or longer packets transferred over the network are decreased to a more manageable size. Packets that are deemed too long are broken into smaller packets for transfer over the network and reassembled into the original packets after being transferred over the network. Further, the packets may be prioritized for transfer to meet service requirements for each service. Smaller, more evenly sized packets allow for more efficient packet processing and prioritization to meet service requirements in light of network restraints. Greater detail is provided after an overview of a communication environment capable of supporting the present invention.

Figure 1:
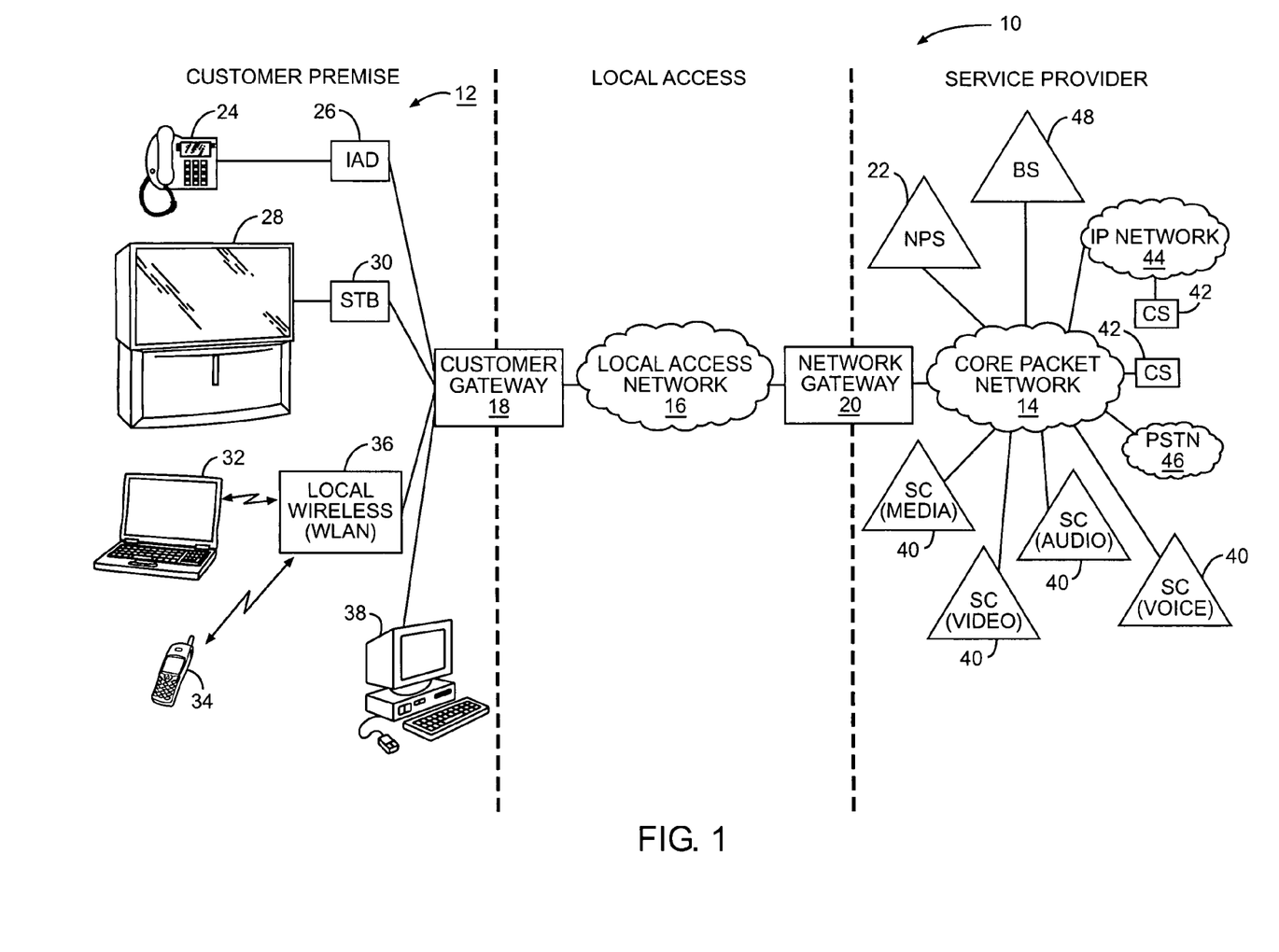
FIG. 1 is a block representation of a communication environment according to one embodiment of the present invention.

With reference to FIG. 1, a communication environment 10 according to one embodiment of the present invention is illustrated. The communication environment can simultaneously support various types of services, such as data, audio, video, and voice, wherein each service may be associated with different quality of service requirements. As such, network resources required for each service and each subscriber for any given type of service may differ.

The communication environment 10 may include various types of customer premise equipment (CPE) 12 that receive packet-based services from a core packet network 14 via a local access network 16. Depending on configuration, an access node, such as a customer gateway 18, may be provided to terminate the local access network 16 for the CPE 12. Similarly, another access node, such as network gateway 20, may be provided to facilitate interworking between the local access network 16 and the core packet network 14.

The customer gateway 18 and the network gateway 20 may operate under the control of a network policy server (NPS) 22, which essentially controls traffic flows based on required parameters defined for the flows and the capability of the local access network 16. The NPS 22 will cooperate with the customer gateway 18, the network gateway 20, or both to allocate resources and ensure a desired quality of service, along with providing control or shaping of traffic flow for each service supported by the local access network 16. Depending on the available bandwidth and the number of services implemented, the NPS 22 may cooperate with the customer gateway 18 and the network gateway 20 to control packet queuing and make decisions on prioritizing packets based on the parameters associated with each service. Notably, the NPS 22 may be provided by the service provider or other network enterprise.

In one embodiment, different types of services for different customers may be simultaneously supported over the local access network 16. The CPE 12 may take many forms and support various types of services, such as circuit-switched or packet-based telephony, television, data, audio, and video. Various types of CPE 12 are represented in FIG. 1, but those skilled in the art will recognize that the invention is not limited to the illustrated embodiments. The CPE 12 may take many forms, such as a telephony terminal 24, associated with an integrated access device (IAD) 26, which effectively performs voice over packet-to-Plain Old Telephone System (POTS) adaptation. For television service, a television 28 may be supported by a set top box (STB) 30 to facilitate television service. A notebook computer or PDA 32, as well as a mobile terminal 34 may facilitate local wireless communications via a local wireless access point 36, which may facilitate local wireless communications using Wireless Local Area Network (WLAN), Bluetooth, or other local wireless technology. A personal computer 38 may also be provided to facilitate various types of media services, including streaming audio, video, and voice, along with traditional data services.

In operation, the NPS 22 will have access to information bearing on the services that a particular subscriber is authorized to use. The information controlling access to these services is generally referred to as a user policy, which will have various parameters defining the resources that are either necessary or authorized to be used to facilitate the service. The NPS 22 will also keep track of the overall resources available through the local access network 16 as well as the services being implemented at any given time. As such, the NPS 22 will recognize which resources are being used and which resources are available for new services. Based on this information, intelligent decisions can be made to ensure that a requested service can be fulfilled.

In general, the services are provided in uni-directional or bi-directional communication flows with the CPE 12 over the local access network 16. The traffic flows, which ride on top of the packet flows, are generally controlled by service controllers (SCs) 40, which may interact with the CPE 12 to facilitate the transmission of packets between the CPE 12 and a content server (CS) 42. In general, the service controllers 40 will cooperate with the content servers 42, and perhaps with the CPE 12, to facilitate the delivery of content to effect a service. Alternatively, the services may be provided by other entities provided in an associated Internet Protocol (IP) network 44 or the Public Switched Telephone Network (PSTN) 46, which may be coupled to the core packet network 14 via an appropriate gateway (not shown).

In response to a service request, the service controllers 40 will communicate with the appropriate content server 42, and perhaps the affected CPE 12, to facilitate packet delivery for the requested service. If the requested service is high-definition television content, the content server 42 delivers a high-definition television program to the television 28 via the set top box 30. The customer gateway 18 and the network gateway 20 may cooperate with the NPS 22 to ensure that the content is delivered with a required quality of service, and ensure that other services by the same or another customer do not interfere with the high-definition television content. To prevent such conflict, a requested service may be denied if there is insufficient bandwidth or other resources to provide the service; quality of service levels may be adjusted, if authorized, to accommodate the multiple services; or a service may be eliminated according to a defined priority profile.

In one embodiment of the present invention, the various services may be accounted for in different manners, such that telephone services are billed at a different rate than television or data services. In this instance, various ones of the NPS 22, service controller 40, or content server 42 may facilitate accounting or billing, and may generate billing information or send sufficient information to a billing server (BS) 48 to effect billing for the particular services. Depending on the implementation of the services, each service may be accounted for on a per-service basis, such as pay-per-view television, or a service may be provided on a limited basis for a monthly fee wherein additional features may include additional charges.

Figure 2:
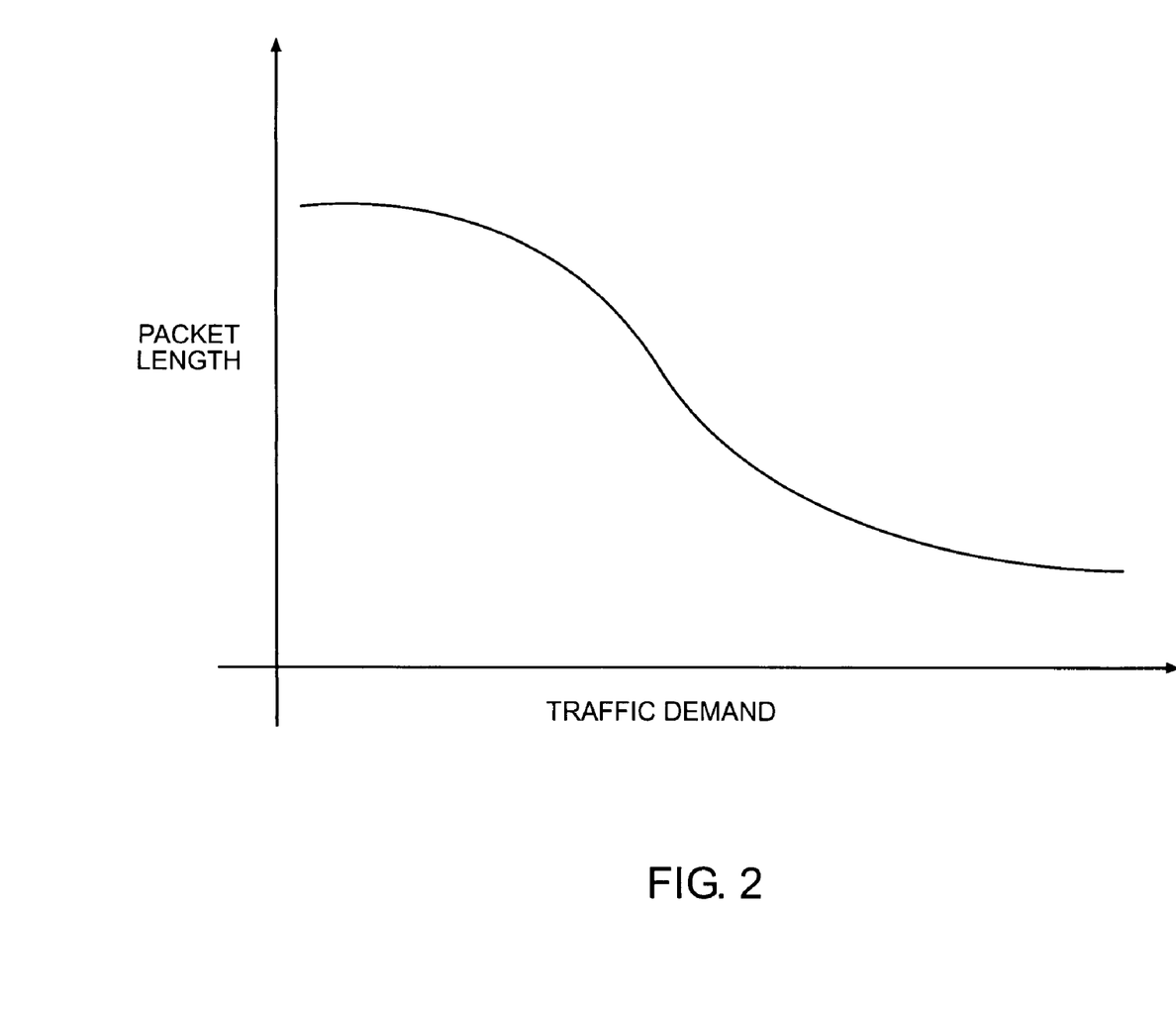
FIG. 2 is a graph illustrating a reduction in packet length as traffic demand increases according to one embodiment of the present invention.

As indicated above, the present invention functions to shorten the length of packets being transferred over a particular network as overall traffic demand increases. The effective shortening of packets may apply to all packets or to certain packets being transferred over the network. Selecting the packets to shorten may depend on various parameters, including the packet being longer than a defined length, the packet being associated with a particular type of media, the packet being associated with a particular customer, quality of service requirements for current or other services, network capacity, or a combination thereof. Those skilled in the art will recognize other parameters that may impact selecting packets to shorten and defining lengths to which the packets are shortened or a maximum length packets may be. Further, the maximum length of those packets to be shortened may vary depending on these parameters. With reference to FIG. 2, a graph is provided to show how a maximum packet length decreases as overall traffic demand on a network increases.

The present invention is particularly beneficial in multi-service environments where time-sensitive traffic is being transmitted over the network with other time-sensitive traffic, non-time-sensitive traffic, or a combination thereof. In many instances, non-time-sensitive traffic, such as that associated with basic data transfers, may result in relatively long packets, wherein transmitting very long packets along with time-sensitive packets may negatively impact quality of service associated with the time-sensitive traffic. For instance, transmitting a large number of long data packets may cause excessive delay when trying to transmit real time audio, video, or voice traffic.

In one embodiment, as real time traffic demand increases, the maximum packet length for the current and other sessions decreases. Limits may be set to limit how much packets may be shortened. If there is limited or no time-sensitive traffic, there may be no need to shorten packets, or the thresholds at which packets are to be shortened may be increased, at least until no packets are shortened. If there is no time-sensitive traffic, packets of any length may be transferred across the network.

The criteria to determine if packets need to be shortened and by how much to shorten them may be based on service information pertaining to a particular service being provided, as well as on network information bearing on the ability of the network to support the current service and currently active services. The network information may include the overall capacity of the network, the number and type of other services currently being supported by the network, the resources currently available, general network characteristics such as packet loss, latency, jitter, and bandwidth, or a combination thereof. Those skilled in the art will recognize other network information that may play a role in determining when and to what degree packets should be shortened.

The service information will generally relate to the current service being requested. The service information may include quality of service information defining performance parameters, including packet loss, latency, jitter, and bandwidth, for the current service, the relative priority of the service with respect to other services, or any other parameters based on the subscription of the customer requesting the service.

In operation, the NPS 22 will have access to the desired service information and network information that will determine packet length criteria for the requested service, other active services, or a combination thereof. The NPS 22 essentially has a comprehensive view of current network activity, and based on the network's overall capabilities, will determine how best to control the current session and perhaps the other active sessions. With such overall knowledge, the packet lengths for the current service, other services, or both, may be controlled. Further, the relative priority for transferring packets for the current and other services can be defined. The NPS 22 will provide instructions to an appropriate access node, such as the customer gateway 18 or the network gateway 20, such that these access nodes may determine when and how to shorten packets for select or all services, as well as set a priority for transmitting packets over the network.

Figure 3:
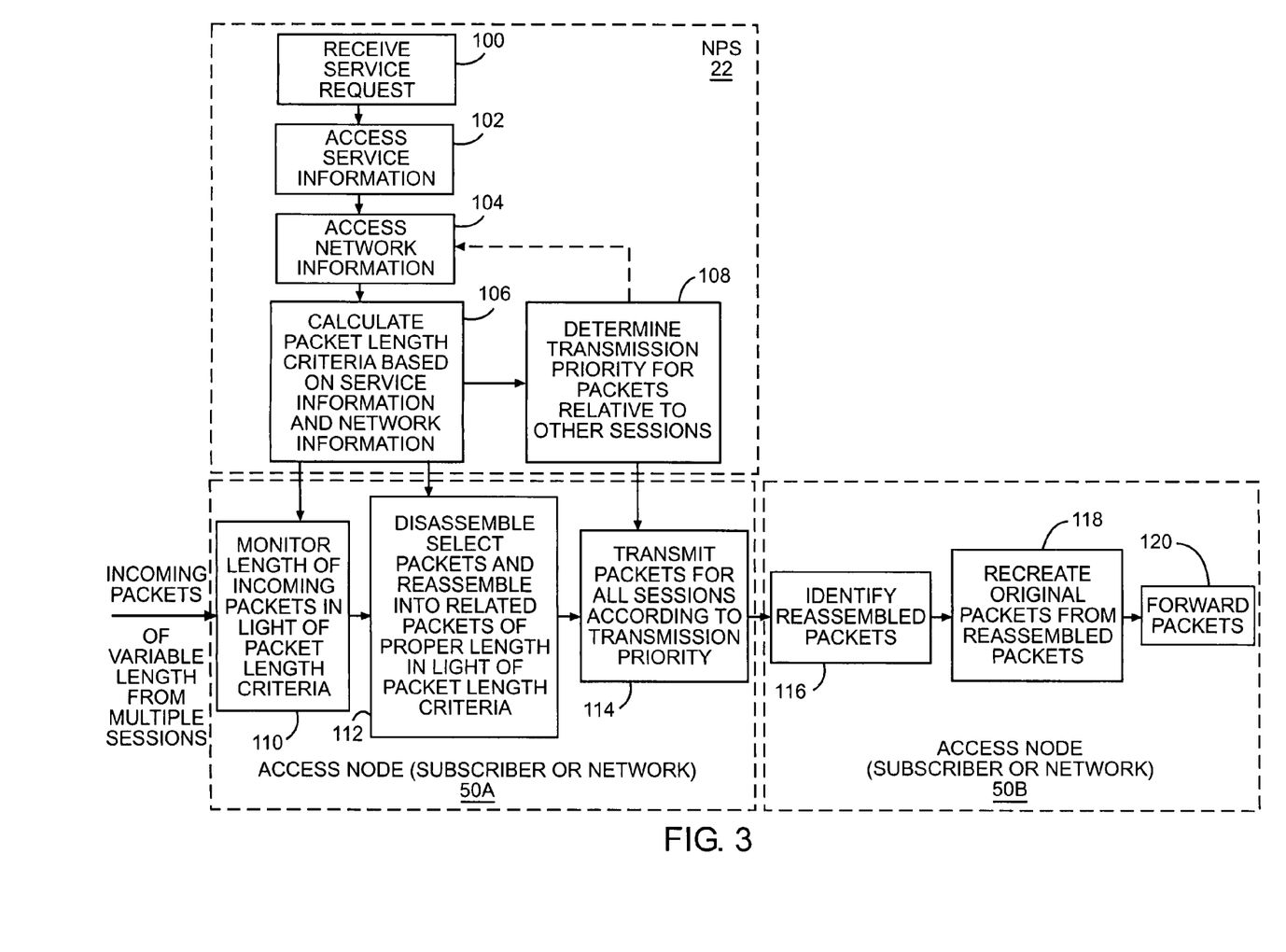
FIG. 3 is a flow diagram illustrating packet processing according to one embodiment of the present invention.

With reference to FIG. 3, an operational flow according to one embodiment of the present invention is illustrated. As depicted, the operational flow is divided into three sections, which correspond to operation of the NPS 22, a first access node 50A on one side of a network, and a second access node 50B on an opposite side of the network. These access nodes 50A and 50B may represent the customer gateway 18 or network gateway 20 of FIG. 1. Accordingly, the network over which packets are transmitted is the local access network 16. However, those skilled in the art will recognize that these access nodes 50A, 50B may take many forms and be associated with various types of networks. As such, the present invention is not limited to being applied to local access networks 16.

In operation, a service request is directly or indirectly provided to the NPS 22 when a customer requests a service, such as requesting to view a high-definition television channel (step 100). The NPS 22 will access the relevant service information for the customer (step 102) and then access pertinent network information (step 104). The service and network information may be stored in the NPS 22 or obtained from other entities associated with the corresponding network or service provider databases. Once the service and network information are acquired, the NPS 22 may calculate the packet length criteria based on the service and network information (step 106). Further, the NPS 22 may determine the relative transmission priority for the current session supporting the requested service request, relative to other sessions used to fulfill other service requests of the customer or other customers (step 108). The NPS 22 will then provide the packet length criteria and transmission priority information to access node 50A.

Once armed with the packet length criteria and the transmission priority information, access node 50A will process incoming packets, which may be of variable length and be associated with multiple sessions supporting multiple services. Again, these various services may be of different types, including both time-sensitive and non-time-sensitive traffic information, and may be associated with different requirements for quality of service parameters based on subscription requirements. As such, access node 50A will monitor the length of the incoming packet in light of the packet length criteria for select or all sessions (step 110). In general, the packet length criteria will define a maximum packet length for packets associated with one or more of the sessions. Notably, the maximum length may vary in real time based on changing service information or network information. Further, different sessions or types of sessions may have different packet length criteria applied at any given time. For those packets exceeding a defined length according to the packet length criteria, the packets are disassembled and reassembled into related packets of appropriate length in light of the packet length criteria (step 112). These smaller related packets are then placed in a queue and transmitted according to the appropriate transmission priority that was provided by the NPS 22 (step 114). Once the packets arrive at access node 50B, the packet that were disassembled and reassembled into smaller packets are identified (step 116) and used to recreate the original packets (step 118). The recreated packets, along with any unmodified packets, are then forwarded as necessary over other networks or to appropriate CPE 12 as the case may be (step 120).

Throughout this process, the packet length criteria may change in a dynamic fashion for a given session or for all sessions that are active. As work demands change, the packet length criteria may change as well as the transmission priority information. As new service requests are made and network traffic increases, the maximum length of packets and the relative priorities may change as desired. As such, a fixed maximum length may be set for all services in a dynamic fashion, or different limits may be provided to select services. Those skilled in the art will recognize the tremendous flexibility in applying the concatenation principles of the present invention, as well as the parameters with which the packet length criteria and transmission priority information are determined. The ability to control packet lengths and perhaps transmission priority allows service providers to operate more efficiently to support multiple, simultaneous communication sessions, with varying media types and having different performance requirements over a given network.

Figure 4:
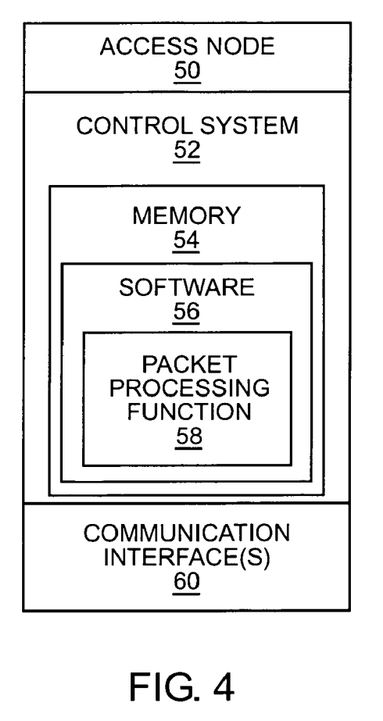
FIG. 4 is a block representation of an access node according to one embodiment of the present invention.

Turning now to FIG. 4, a block representation of an access node 50 is provided according to a standalone embodiment of the present invention. The access node 50 may include a control system 52 having memory 54 with sufficient software 56 to facilitate operation as described above. In particular, a packet processing function 58 is implemented in the software 56 (hardware or firmware), to communicate with the NPS 22 to obtain the packet length criteria and transmission priority information. The control system 52 may be associated with one or more communication interfaces 60 to facilitate communication with the CPEs 12, other gateways, or networks such as the local access network 16.

Figure 5:
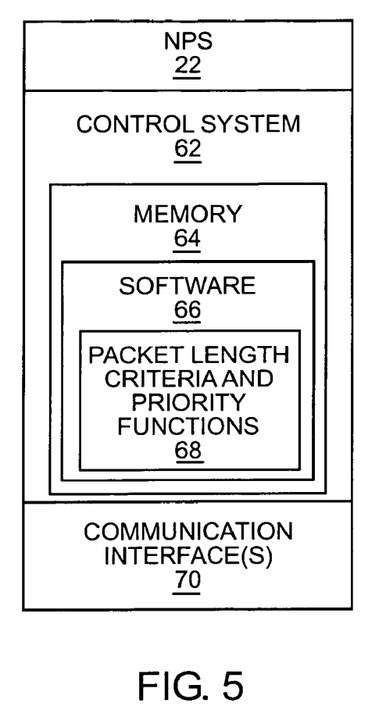
FIG. 5 is a block representation of a network policy server according to one embodiment of the present invention.

With reference to FIG. 5, the NPS 22 represents a logical function, but may be implemented in a traditional network server having a control system 62 with memory 64 for software 66 to control operation as described above. The software 66 will include packet length criteria and transmission priority functions 68, which function as described above. The control system 62 is also associated with at least one communication interface 70.

Those skilled in the art will recognize improvements and modifications to the preferred embodiments of the present invention. All such improvements and modifications are considered within the scope of the concepts disclosed herein and the claims that follow.

What is claimed is:

1. A system to facilitate dynamic packet concatenation comprising:
   a communication interface; and
   a control system associated with the communication interface that:
      determines packet length criteria for services provided over a network; and
      provides the packet length criteria to an access node for the network, wherein original packets exceeding a length defined by the packet length criteria are disassembled into shorter packets for delivery over the network by the access node and then reassembled to recreate the original packets after traversing the network,
   wherein the control system accesses service information for at least one of the services, and the packet length criteria is based on the service information.

2. The system of claim 1 wherein the packet length criteria for the at least one of the services is updated as new services are requested and established over the network.

3. The system of claim 1 wherein the control system further accesses network information bearing on a capability of the network, and the packet length criteria is further based on the network information.

4. The system of claim 1 wherein the control system further receives a request for a new service and the service information comprises information for the new service.

5. The system of claim 1 wherein the control system further:
   determines transmission priority information based on relative priorities for the services; and
   provides the transmission priority information to the access node, wherein packets for the services are sent across the network according to the transmission priority information.

6. The system of claim 1 wherein the services support different media types, which are associated with different quality of service parameters.

7. The system of claim 1 wherein the services are associated with one customer.

8. The system of claim 1 wherein certain of the services are associated with different customers.

9. The system of claim 1 wherein the length defined by the packet length criteria decreases as traffic over the network increases throughout a given range of traffic density.

10. The system of claim 1 wherein the length defined by the packet length criteria decreases as time sensitive traffic over the network increases for a given range of traffic density.

11. The system of claim 1 wherein when there is less than a defined amount of time-sensitive traffic, no packets are shortened.

12. The system of claim 1 wherein the network is an access network.

13. A system to facilitate dynamic packet concatenation comprising:
    a communication interface adapted to facilitate communications over the network; and
    a control system associated with the communication interface that:
       receives packet length criteria for services provided over a network;
       receives first packets;
       identifies longer packets, which exceed a length defined by the packet length criteria and are part of the first packets;
       disassembles the longer packets; and
       creates shorter packets for delivery over the network,
    wherein the packet length criteria is based on service information for at least one of the services.

14. The system of claim 13 wherein the packet length criteria for the at least one of the services is updated as new services are requested and established over the network.

15. The system of claim 13 wherein the first packets are received for transmission over the network and the control system further:
    receives second packets from the network, the second packets including shortened packets, which were created from long packets in light of the packet length criteria; and
    recreates the long packets from the shortened packets.

16. The system of claim 13 wherein the packet length criteria is based on network information bearing on a capability of the network.

17. The system of claim 13 wherein the control system further:
    receives transmission priority information based on relative priorities for the services; and forwards the shorter packets and any first packets that were not shortened over the network according to the transmission priority information.

18. The system of claim 13 wherein the services support different media types, which are associated with different quality of service parameters.

19. The system of claim 13 wherein the services are associated with one customer.

20. The system of claim 13 wherein certain of the services are associated with different customers.

21. The system of claim 13 wherein the length defined by the packet length criteria decreases as traffic over the network increases throughout a given range of traffic density.

22. The system of claim 13 wherein the length defined by the packet length criteria decreases as time-sensitive traffic over the network increases for a given range of traffic density.

23. The system of claim 13 wherein when there is no or less than a defined amount of time-sensitive traffic, no packets are shortened.

* * * * *

UNITED STATES PATENT AND TRADEMARK OFFICE
CERTIFICATE OF CORRECTION

PATENT NO.        : 7,633,972 B1                                        Page 1 of 1
APPLICATION NO. : 11/069656
DATED             : December 15, 2009
INVENTOR(S)       : Stephen Bennett Elliott It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1297 days.

Signed and Sealed this

Ninth Day of November, 2010

David J. Kappos
*Director of the United States Patent and Trademark Office*